Figure 1:
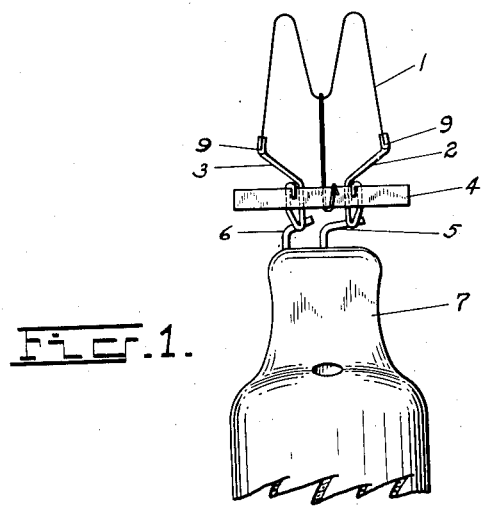

March 7, 1933.  J. B. FITZPATRICK  1,900,100

METHOD OF WELDING METALS

Filed July 17, 1929

INVENTOR
J.B. FITZPATRICK
BY
ATTORNEY

Patented Mar. 7, 1933

1,900,100

UNITED STATES PATENT OFFICE

JOHN BERNARD FITZPATRICK, OF EAST ORANGE, NEW JERSEY, ASSIGNOR TO WESTINGHOUSE LAMP COMPANY, A CORPORATION OF PENNSYLVANIA

METHOD OF WELDING METALS

Application filed July 17, 1929. Serial No. 378,876.

This invention relates to a method of uniting metal bodies by welding and more particularly relates to a method of uniting refractory metal filaments to lesser refractory leading-in and support wires, in the manufacture of electrical devices such as incandescent electric lamps, electron discharge devices, and the like.

Heretofore it has been customary to fusibly unite the filament of an incandescent electric lamp or the filament of an electron discharge device to a more rigid electrically conductive leading-in or support wire by electrically spot or arc welding the filament thereto.

In the electric spot or arc welding of two metals it is the practice to bring the metal faces into intimate contact and then pass therethrough a heavy electric current or to play an electric arc over the contacting metals at the desired point of union. In either method one or both of the metals are rendered fluid at the welding point thus uniting the two together.

It is found in thus uniting filaments of the tungsten class to lesser refractory more ductile support or leading-in wires that this union is fragile and may be readily broken above and below the weld. This fragile condition of the filament is highly undesirable as it causes early failure of the electric device incorporating the same through premature fracture as a result of shock and vibration incident to handling, shipping, operation and the like.

It is one of the objects of this invention to improve the method of electrically welding metals of the tungsten class.

Another object of this invention is to provide a method for forming rugged non-brittle welded unions of one of the metals of the tungsten class, with a lesser refractory ductile metal.

Another object of this invention is to provide an improved method of mounting filaments of the tungsten class in electric devices such as incandescent lamps, radio tubes and the like.

Another object of this invention is to improve the life and maintenance of electrical devices employing incandescent refractory metal filaments.

Other objects and advantages will become apparent as the invention is more fully disclosed.

In accordance with the objects of my invention I have determined that brittle welds or unions of a metal of the tungsten class and a lesser refractory more ductile metal such as nickel, for example, are caused primarily by the recrystallization of that portion of the tungsten class metal included in and adjacent to the weld. In such a recrystallized state the tungsten class metals are exceedingly brittle, and that portion of the recrystallized tungsten class metal adjacent the weld may be readily broken when subjected to slight strain.

I have found that the embrittling features heretofore encountered may be substantially eliminated by causing the lesser refractory ductile metal to contact along the surface of the tungsten class metal through this area of recrystallization into the area of ductile unrecrystallized metal. The welded union of ductile refractory metal and ductile lesser refractory metal then obtained is rugged and non-brittle even after prolonged burning at elevated temperatures.

In the application of this invention to the welding of drawn filamentary bodies of tungsten and the like metals to ductile leading-in support wires such as nickel I substantially effect a welded union of the tungsten filament to the lead in or support wire in such manner as to cause the metal of the lead wire to envelop or to enfold the filament at a point remote from the welded portion, said enfolded portion being substantially unaltered in crystal structure as a result of the welding heat applied thereto.

Before further disclosing the nature of my invention reference should be had to the accompanying drawing, wherein Fig. 1 shows a side elevational fragmentary view of a radio tube filament mount utilizing the present invention.

Figure 2:
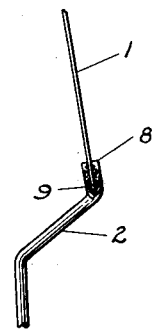
Figure 3:
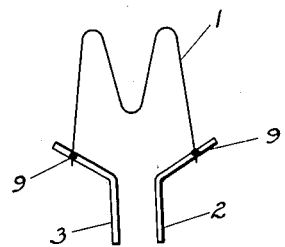

Fig. 2 is an enlarged fragmentary diagrammatic view of a welded union made in accordance with the present invention; and Fig. 3 is a side elevational view of an old type method of mounting filaments which is shown by way of comparison.

In Fig. 1 it may be noted that the two legs of the M shaped refractory metal filament 1 are welded to filament support members 2 and 3 which in turn are rigidly positioned in refractory insulator member 4 and electrically connected to leading-in wires 5 and 6 extending through press 7. This particular type of filament mounting is employed in an electron discharge device of the 50 watt oscillator type and is only used herein by way of illustration of the present invention.

Fig. 2 illustrates by way of an enlarged diagrammatic view thereof, the essential features of the present invention. It may be noted that a portion of the filament support member 2 is bent so as to intercept the angle of one of the legs of the filament 1, at this interception the support member is again bent at such an angle as to be directly in line with the leg of the filament 1. The section of the support member marked 8 is flattened out and the filament is welded thereto as indicated, at point 9 which is at a predetermined distance below the top of the flattened section. This second bend of the leading-in support wire in line with the filament, the flattened portion thereof, and the method of uniting the filament to this flattened section, comprises the essential features of the present invention, as applied to the mounting of filaments in incandescent lamps, radio tubes and the like electrical devices.

An old type of filament mounting is shown in Fig. 3 wherein the legs of the filament 1 are brought in angular contact with the leading-in support wires 2 and 3, and spot welded thereto as indicated at the point 9 of the intersection.

I have found that the recrystallization of the tungsten class metal as a result of the application of the welding heat to the metal filament decreases from the point of the weld in either direction along the axis of the tungsten filament. The particular distance along the wire axis at which the recrystallization effects totally disappears is dependent upon the conditions existing during the particular welding operation, such as the electrical current applied, the heat energy liberated, the time of exposure thereto, the specific materials involved, size and shape of the materials and the like factors.

Such factors, however, may be readily standardized and made constant for any given set of materials, or for any given welding operation that may be repeated a great number of times.

In the present instance filament 1 is a pure tungsten filament of approximately 8 mil (.008 inches) diameter, the leading-in support wires 2 and 3 are comprised of nickel, of approximately 25 mil (.025 inches) diameter, and the flattened portion 8 of the leading-in wire is approximately 350 mil (.350 inches) in length, and of approximately 18 mil (.018 inches) in thickness.

With these materials I have found that the heat energy liberated when a welding current of approximately 75 amperes at 0.6 volts is passed through the two contacting materials for approximately 10 seconds is sufficient to effect a recrystallization of the tungsten filament along the wire axis for a distance of approximately 1 millimeter in either direction along the wire axis. As the particular time interval is likely to be variable this distance also will vary materially.

It is noted, however, that at this welding heat the nickel portion of the weld is rendered fluid for a distance of from 1 to 2 millimeters along the wire axis. The fluid nickel therefore is caused to unite with or to enclose at a distance of approximately 2 millimeters from the point of the weld, a portion of the tungsten filament 1 which is unrecrystallized and still fibrous in structure. By applying the welding heat to the tungsten wire laying along the flattened portion of the lead support wire at a point which is substantially 2 millimeters below the top of this flattened section, the welded union is extended along the wire axis to the top of the flattened section encompassing or enclosing at this top section a part of the tungsten wire which is unrecrystallized or which is still in the fibrous ductile state.

The weld thus obtained comprises essentially in a firm union of a pliable tungsten filamentary body with a pliable and ductile nickel base rather than a recrystallized brittle tungsten filament fusibly united with the ductile nickel weld as heretofore obtained. This welded union obtained as a practice of this invention is rugged and resistant to fracture as a result of shock and strains incident to subsequent handling during the remainder of the mounting, assembly, and other manufacturing operations to complete the device.

Subsequent to manufacture when the filament is subjected to the recrystallization effects incident to incandescing during operation it will be found that this rugged weld or union of ductile fibrous tungsten and ductile nickel substantially retains its high strength and physical characteristics due to the greater heat dissipation of the large nickel leading-in support wires. This cooling effect extends beyond the upper edge of the flattened portion of the lead wire for an appreciable distance, thus preventing entire recrystallization of the fibrous tungsten filament within this area during incandescing of the filament.

Whereas in this specific embodiment of the practice of my invention I have utilized a tungsten filament it is to be appreciated that the invention is not to be restricted thereto as other refractory metals of similar physical characteristics such as molybdenum, chromium, or alloys of these metals with each other and with tungsten would be similarly effected by welding temperatures and would have their fibrous structure altered to a non-ductile recrystallized structure.

Furthermore while I have specifically applied the present invention to filamentary bodies it may be readily appreciated that welded unions of any worked body of the metals of the tungsten class, such as wire, rod and sheet forms thereof may be made provided that the welded union thereof with the ductile metal is made to extend through the area of recrystallized welded metal to the unrecrystallized ductile metal adjacent thereto. It is also apparent that whereas nickel has been specifically disclosed as the ductile metal base to which the tungsten class metal is welded other ductile metals such as monel, nickel-chromium alloys, copper nickel alloys, and the like may be substituted for the nickel without departing essentially from the nature of my invention.

Having broadly and specifically outlined the nature and scope of my invention and given a specific embodiment of the same it is apparent that there may be many variations of the same without essentially departing from the invention as set forth in the following claims:

What is claimed is:

1. The method of welding wrought tungsten bodies to nickel which comprises contacting the tungsten and nickel bodies over a relatively large area, welding the two metals together at one point on said contacting surfaces, simultaneously effecting a substantial fusing of the lesser refractory metal along the contacting surface of the tungsten away from the welded union until the bonded union of the two metals has extended beyond the area of grain recrystallization of the said tungsten produced as a result of the application of the welding heat thereto.

2. The method of welding a ductile tungsten filament body to a lesser refractory ductile metal which comprises contacting the lesser refractory ductile metal body along the wire axis of the said tungsten filament for a relatively large distance, applying at the end of the tungsten filament the welding heat sufficient to effect the welding of the tungsten and lesser refractory metal at that end and a substantial fusing of the lesser refractory metal along the wire axis to a point beyond the area of grain recrystallization produced in said tungsten wire as a result of the application of the welding heat thereto.

3. The method of forming a non-brittle weld between a ductile tungsten filamentary body and nickel, which comprises contacting the tungsten and nickel along the wire axis for an appreciable distance, applying at the end of the tungsten wire sufficient heat energy to fusibly unite the two metals at that point and fuse the nickel at a decreasing temperature gradient along the contacting wire axis to a point substantially beyond the area of recrystallization developed in said tungsten as a result of the application of said welding heat thereto.

4. The method of forming a non-brittle weld union between a drawn tungsten filament and a nickel support wire which comprises flattening the end of said nickel support wire, contacting the end of the tungsten filament in overlapping relation to said flattened portion, the wire axis of both the tungsten filament and the nickel support wires being in substantially the same plane, welding the end of the tungsten filament to the base of said flattened portion and simultaneously effecting a fusing of the nickel along the tungsten filament axis to a point remote from the welded union so as to enclose a section of said tungsten filament adjacent the end of said flattened portion of the nickel which is substantially unaltered in crystal structure as a result of the heating due to said welding operation.

5. As an article of manufacture a two piece welded metal article comprising a metal of the tungsten class fusibly united with a lesser refractory ductile metal, the lesser refractory metal enveloping and extending along the surface of the metal body of the tungsten class past the area of recrystallization of said tungsten class metal body into the area of unrecrystallized metal.

6. As an article of manufacture a non-brittle two piece overlapping metal weld comprised of tungsten and nickel the end of said tungsten being fusibly united to said nickel and the end of said nickel being fusibly united to a substantially ductile section of said tungsten.

7. As an article of manufacture a non-brittle two piece metal weld comprised of a drawn tungsten filamentary body and nickel wire of relatively larger diameter than said tungsten filamentary body in overlapping end relation to each other the end of the tungsten wire being welded to the nickel wire and the end of the nickel wire enclosing a section of the tungsten adjacent the welded union which is substantially unaltered in its drawn fiber state.

8. As an article of manufacture a two piece metal weld comprised of a drawn tungsten filamentary body and nickel wire, the ends of said tungsten and said nickel being fusibly united together in overlapping relation to each other, the nickel section of said weld being perceptibly flattened, and the said tungsten and nickel wires being fusibly united at a point remote from the end of said flattened section and the said nickel enclosing the said tungsten along its wire axis to a point adjacent the end of said flattened section where a portion of said tungsten filament is enclosed which is unaltered in its original drawn fibrous crystal structure.

In testimony whereof, I have hereunto subscribed my name this 16th day of July 1929.

JOHN BERNARD FITZPATRICK.